UNITED STATES PATENT OFFICE 2,086,340

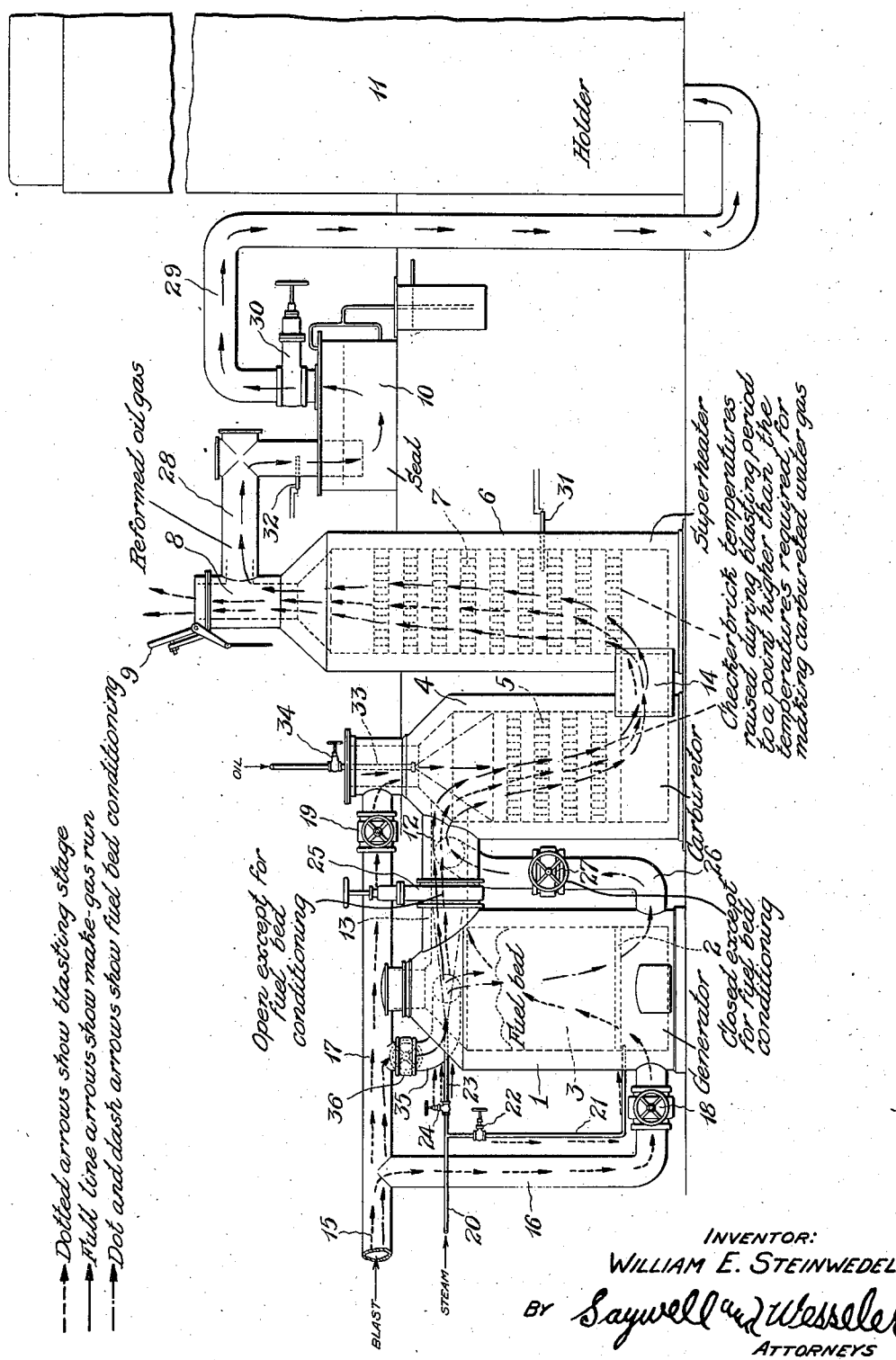

PROCESS OF MAKING A SUBSTITUTE GAS FOR NATURAL GAS IN STANDARD CARBURETED WATER GAS APPARATUS

William E. Steinwedell, Cleveland Heights, Ohio, assignor to The Gas Machinery Company, Cleveland, Ohio, a corporation of Ohio Application February 27, 1933, Serial No. 658,775

2 Claims. (Cl. 48—214)

My invention particularly relates to a process of producing a gas which will be satisfactory as a substitute for natural gas by the use of standard apparatus for producing carbureted water gas, which substitute gas will have burning characteristics quite analogous to those of natural gas, so that the pilot lights, burner equipment, and cooking utensils will not become sooted. Gases which produce these sooty conditions contain a too high percentage of illuminants, due to the production of the gases at the temperatures usually employed in manufacturing carbureted water gas. The sooty condition results in the gas losing considerable heating value on cooling or by compression. Furthermore, the substitute gas produced by my improved process has a specific gravity which is not so high as to cause a noisy flash-back in the burners, which condition obtains with the gases just mentioned. These gases mentioned furthermore do not have characteristics approximating those of natural gas. The disadvantages which have been mentioned, as also lack of economy, have been present in a gas which has heretofore been made in carbureted water gas sets by enriching a small amount of blue gas produced in the generator with a large amount of oil gas made in the carbureter and superheater. In thus heretofore attempting to produce a satisfactory gas, it was attempted to produce a thermal value sufficiently high, a proper specific gravity, and a suitable chemical analysis, but the disadvantages mentioned are present in the product thus produced.

Primarily, my improved process which results in the elimination of the disadvantages mentioned depends upon operating the carbureted water gas set upon a temperature cycle instead of a time cycle. Specifically, the cycle is controlled by the temperature of the checkerbrick in the carbureter and superheater. As hereinafter described in detail, the checkerbrick in the carbureter and superheater are raised during the air-blasting period to a higher point than that to which they are usually raised in standard carbureted water gas making practice, and the oil gas made is subjected to this higher temperature, preferably in a steam atmosphere, which effects a reforming of the oil gas with consequent advantages hereinafter fully described.

The annexed drawing and the following description set forth in detail certain steps illustrating my improved process, these steps constituting but a few of the various series of steps by which the improved process may be carried out.

The annexed drawing consists of a single figure illustrating one standard form of apparatus for the production of carbureted water gas.

In said annexed drawing:

A generator 1 is provided with a grate 2 upon which is built the fuel bed 3, the set also comprising a carbureter 4 with its checkerbrick 5, a superheater 6 with its checkerbrick 7, and a stack T 8 upon the superheater 6 which is controlled by the stack valve 9. The gas products for storage and use are conducted from the superheater 6 through a pipe 28 to a seal 10 and thence to a holder 11 through the pipe 29. A connection 12 having a lining 13 and controlled by valve 25 communicates with the generator 1 and carbureter 4. There is also a connection 14 between the carbureter 4 and the superheater 6. The connection 29 between the seal 10 and the holder 11 is controlled by a valve 30. For the purposes of the usual air-blasting, a main air line 15 is formed with branches 16 and 17 which communicate respectively with the bottom of the generator 1 and the top of the carbureter 4, these branch blast lines 16 and 17 being provided with valves 18 and 19, respectively. An auxiliary air line 35 connects the branch line 17 with the top of the generator 1 and is controlled by valve 36. Standard water gas sets are designed for both steam up-runs and steam down-runs through the generator 1, and to that end a main steam line 20 is formed with branches 21 and 23 which communicate respectively with the bottom and top of the generator 1 and are provided with valves 22 and 24, respectively. When, in carbureted water gas manufacture, the "make" of blue gas is upwardly through the generator 1, the hot gas valve 25 controlling the connection 12 is open, and when the "make" of blue gas is downwardly through the generator 1, a hot gas valve 27 controlling a conduit 26 extending from the bottom of the generator 1 to the connection 12 is open. Depending upon the direction of the "make", one of these valves 25 and 27 is closed and the other is open, as will be readily understood by those skilled in the art. There are various designs of carbureted water gas apparatus for taking the blue gas off from the bottom of the generator 1, upon the down-runs, and one of the standard designs provides for conducting this down-run gas to the connection 12 and thence to the carbureter 4. I have shown this design in the accompanying drawing, for purposes of illustration. Any other standard design of carbureted water gas apparatus would be equally suitable for the purpose of carrying out my improved process.

The valve 25 controlling the connection 12 between the generator 1 and the carbureter 4 remains open during the entire cycle of my improved operation and the valve 27 controlling the connection 26 remains closed, except as hereinafter mentioned relative to conditioning of the fuel bed. These valves 25 and 27 are the hot gas valves controlling the respective up and down make-gas runs of a standard carbureted water gas set of the design shown, and are alternately or periodically opened and closed, respectively, for these respective runs when using the set for normal operation. However, the bottom offtake 26 from the generator 1 is not utilized in the working of my improved process, the blasting and gas-making of this process being always upwardly through the generator 1, so that no use is made of the standard connection 26 between the generator 1 and the carbureter 4, and hence the valve 27 always remains closed, except for certain fuel bed conditioning hereinafter described.

In practicing my improved process, and assuming the fuel bed 3 has been conditioned or is conditioned by reason of previous cycles of operation, the stack valve 9 is first opened, then the steam line valve 22 is opened, the steam valve 24 being closed. Immediately upon opening the steam line valve 22, the generator air blast valve 18 and the carbureter air blast valve 19 are opened, the air blast line valve 36 being closed. In addition to the producer gas made in the generator by the blow, a small amount of blue gas is generated in the generator 3, which gases pass through the connection 12 where they are burned and thence pass downwardly through the checkerbrick 5 in the carbureter 4, through the connection 14 and upwardly through the checkerbrick 7 in the superheater 6 and thence out the stack 8. The small amount of blue gas is generated concurrently with the air-blasting for the purpose of shortening the blow period although such generation of blue gas is not absolutely necessary to effect the improved process.

The air-blasting of the fuel bed 3 in the generator 1, and the simultaneous production of a small amount of blue gas by reason of the reaction of the steam in the fuel bed 3, is continued for such a period as will raise the temperature of the checkerbrick 5 and 7 to a point exceeding that to which they are brought during the air-blasting period in normal carbureted water gas manufacture. For instance, the temperature of the checkerbrick may be raised from about 1450° F. to 1650° F.; whereas, in normal carbureted water gas manufacture this temperature would be raised from about 1350° F. to 1450° F., the temperature during carbureted water gas manufacture and the temperature during the manufacture of my substitute gas both depending on the characteristics of the oil used. But for the same oil characteristics the temperature of the checkerbrick during the manufacture of my substitute gas will be raised higher than for manufacture of carbureted water gas. During the "run" period of my improved process, hereinafter described, the temperature of the checkerbrick will drop to a point approximating that to which it is heated during normal carbureted water gas manufacture.

Then the air blast valve 19 and the air blast 18 and the steam line valve 22 are closed. The apparatus is then ready for a "run", which is effected by opening the steam line valve 24 permitting steam to pass via the line 23 into the top of the generator 1 where it is heated and whence it passes outwardly into the connection 12 where its temperature is further raised by the heat of the lining 13, after which it passes into the top of the carbureter, and thence downwardly through the checkerbrick 5 therein, together with oil which is sprayed into the top of the carbureter 4 from a pipe 33 controlled by a valve 34, this oil-line valve 34 having been opened immediately on opening the steam line valve 24. The oil and steam pass through the checkerbrick 5 and into and through the connection 14 and thence upwardly through the checkerbrick 7 in the superheater 6 and through the stack 8 and outwardly to atmosphere, the stack valve 9 having been left open. As soon as the reformed oil gas made in the carbureter and superheater in the steam atmosphere mentioned commences to issue from the stack 8, the set is making the desired gas suitable for storage and use, so that the stack valve 9 is closed, and the valve 30 opened, and the reformed gas passes through the connection 28 and issues from the dip end thereof into the seal 10 whence it passes through the connection 29 to the holder 11.

The gas-making period is continued until the temperature of the checkerbrick 5 and 7 has fallen to a point below which gas of the desired characteristics, which will be hereinafter explained, is no longer made. The temperature is gauged by pyrometers 31 and 32 which serve, respectively, to measure the temperature of the checkerbrick 7 in the superheater 6, and the temperature of the gas passing through the connection 28 from the superheater 6 to the seal 10. As is well-known to those skilled in the art, the temperature of the checkerbrick 5 in the carburetor 4 tends to lose its heat during the oil-gas-making period faster than does the checkerbrick 7 in the superheater 6, but it is necessary only to watch the temperature-fall in the checkerbrick 7 as this is indicative of the heat to which the oil gas is subjected. When the oil-gas-making period has ended, as determined by the temperature of the checkerbrick 7, or the temperature of the gas produced, the oil-control valve 34 is closed, and the feed of steam into the top of the generator 1 through the steam line 23 somewhat increased in order to more quickly purge the apparatus of oil gas. When the oil gas has substantially all passed beyond the dip end of the connection 28 into the seal 10, the stack valve 9 is opened, the steam line valve 24 closed, the steam line valve 22 opened, the air blast valves 18 and 19 opened, and the set is then ready for the next cycle of operations. Different conditions may dictate some variations in the cycle of operations above-described. In cases where this substitute gas is made for relatively long periods of time, it is advisable occasionally to air blast from the top of the generator 1 by means of an air blast line 35 controlled by the blast valve 36 so that a down air blast may be made through the fire 3 in the generator 1. This operation is for the purpose of maintaining a better condition of the fuel bed and to keep the fire closer to the grates. In this event the reversal valve 25 will be closed and the reversal valve 27 will be opened. The steam valve 24 can also be opened, if desired, during this down-blast.

In those situations where a change has been made from manufactured gas of about 550 B. t. u. to natural gas of about 1000 B. t. u., in order to place a high load factor upon the supply main and obtain a lower cost natural gas, it is necessary that the former carbureted water gas plants be supplied with smaller steam meters and larger capacity oil sprays, so that gas can be manufactured by this process to take care of the peak loads.

The subjecting of the oil gas in a steam atmosphere to the higher temperatures in the carbureter and superheater reforms the high thermal value oil gas with its undesirably high percentage of illuminants down to the desired thermal value and chemical composition, part of the illuminants in the gas being transformed into marsh gas and hydrogen and producing a product which is well fixed and stable. The quality of this resultant product depends upon the temperature to which it is subjected and its time contact with the hot checkerbrick, a higher temperature and longer time of contact producing a gas of lower heating value containing less illuminants, and vice versa. Under the conditions stated, sets which are suitable for making carbureted water gas of about 550 B. t. u. value can be utilized to make a reformed oil gas which will serve as a satisfactory substitute for natural gas of about 1000 B. t. u. value. The reformed gas is burned in the various appliances as adjusted for natural gas with entirely satisfactory operation of the appliances, no sooting of the latter resulting and no noisy flashing back occurring in the burners.

An analysis of a typical product produced by my improved process is as follows:

| | Percent |
|---|---|
| Methane, marsh gas, $CH_4$, approximately | 40 |
| Hydrogen, H, approximately | 28 |
| Carbon monoxide, CO, approximately | 3 |
| Carbon dioxide, $CO_2$, approximately | 5 |
| Nitrogen, N, approximately | 4 |
| Illuminants, approximately | 20 |

The product above analyzed has a B. t. u. value of approximately 1000, and a specific gravity of about .65.

What I claim is:

1. A process of making a substitute gas for natural gas having substantially the same characteristics as natural gas with respect to B. t. u. heating value and burning characteristics, said process being worked in standard carbureted water gas apparatus having a generator, a carbureter, a superheater, a lined connection between the top of the generator and the top of the carbureter, a connection between the carbureter and the superheater, and an outlet from the superheater, which process comprises upwardly air-blasting the fuel bed in the generator and at the same time air-blasting the carbureter above the checkerbrick therein, to heat the top of the generator and the lining of the connection between the generator and carbureter and to heat the checkerbrick in the carbureter and superheater, said blasting being sufficient thereby to heat said checkerbrick materially above the temperature to which the same is heated in carbureted water gas manufacture utilizing oil having substantially the same characteristics as the oil hereinafter mentioned as being admitted to the top of the carbureter; then admitting steam to the top of the generator and passing the same through said connection to the carbureter and at the same time admitting oil to the top of the carbureter, thus producing reformed oil gas in a steam atmosphere in the carbureter and superheater; and then withdrawing the resultant products from the superheater for storage and use when reformed oil gas commences to issue from the superheater, the oil gas production being stopped when the temperature of the checkerbrick has dropped to a point approximating the temperature to which the same would be heated in carbureted water gas manufacture utilizing oil having substantially the same characteristics and admitted to the top of the carbureter.

2. A process of making a substitute gas for natural gas having substantially the same characteristics as natural gas with respect to B. t. u. heating value and burning characteristics, said process being worked in standard carbureted water gas apparatus having a generator, a carbureter, a superheater, a lined connection between the top of the generator and the top of the carbureter, a connection between the bottom of the generator and the top of the carbureter, reversal valves controlling said connections, a connection between the carbureter and the superheater, and an outlet from the superheater, which process comprises upwardly steam-blasting and air-blasting the fuel bed in the generator and at the same time air-blasting the carbureter above the checkerbrick therein, to generate blue gas and producer gas and to heat the top of the generator and the lining of the first-mentioned connection between the generator and carbureter and to heat the checkerbrick in the carbureter and superheater, said blasting being sufficient thereby to heat said checkerbrick materially above the temperature to which the same is heated in carbureted water gas manufacture utilizing oil having substantially the same characteristics as the oil hereinafter mentioned as being admitted to the top of the carbureter; then admitting steam to the top of the generator and passing the same through said first-mentioned connection to the carbureter and at the same time admitting oil to the top of the carbureter, thus producing reformed oil gas in a steam atmosphere in the carbureter and superheater; then withdrawing the resultant products from the superheater for storage and use when reformed oil gas commences to issue from the superheater, the oil gas production being stopped when the temperature of the checkerbrick has dropped to a point approximating the temperature to which the same would be heated in carbureted water gas manufacture utilizing oil having substantially the same characteristics and admitted to the top of the carbureter; and then repeating the cycle, the fuel bed being occasionally downwardly steam-blasted and air-blasted in lieu of upward steam-blasting and air-blasting.

WILLIAM E. STEINWEDELL.